(12) United States Patent
Nakanishi et al.

(10) Patent No.: US 8,932,416 B2
(45) Date of Patent: Jan. 13, 2015

(54) HIGH-STRENGTH AND HIGH-DUCTILITY DIE-QUENCHED PARTS AND METHOD OF MANUFACTURING THE SAME

(75) Inventors: Eizaburou Nakanishi, Kanagawa (JP); Masayuki Miyake, Kanagawa (JP); Kotobu Nagai, Ibaraki (JP); Masao Hayakawa, Ibaraki (JP); Takehito Itagaki, Ibaraki (JP); Takahiko Kanai, Tokyo (JP); Munehisa Hatta, Tokyo (JP); Kazuhiro Kawasaki, Tokyo (JP)

(73) Assignees: Nissan Motor Co., Ltd., Yokohama-shi (JP); National Institute for Materials Science, Ibaraki (JP); Neturen Co., Ltd, Tokyo (JP)

( * ) Notice: Subject to any disclaimer, the term of this patent is extended or adjusted under 35 U.S.C. 154(b) by 212 days.

(21) Appl. No.: 13/375,156

(22) PCT Filed: May 26, 2010

(86) PCT No.: PCT/JP2010/058915
§ 371 (c)(1),
(2), (4) Date: Jan. 31, 2012

(87) PCT Pub. No.: WO2010/137619
PCT Pub. Date: Dec. 2, 2010

(65) Prior Publication Data
US 2012/0118440 A1    May 17, 2012

(30) Foreign Application Priority Data

May 29, 2009    (JP) ................................. 2009-131469

(51) Int. Cl.
*C21D 9/00*    (2006.01)
*B21D 22/02*    (2006.01)
(Continued)

(52) U.S. Cl.
CPC ................ *B21D 22/02* (2013.01); *B21D 22/20* (2013.01); *B21D 37/16* (2013.01); *C21D 1/42* (2013.01);
(Continued)

(58) Field of Classification Search
USPC .................................................... 148/567, 325
See application file for complete search history.

(56) References Cited

U.S. PATENT DOCUMENTS 5,409,554 A * 4/1995 Leap .............................. 148/653
5,427,600 A * 6/1995 Itoh et al. ......................... 75/232
(Continued)

FOREIGN PATENT DOCUMENTS

JP    2003-253385 A    9/2003
JP    2006-051543 A    2/2006
(Continued)

OTHER PUBLICATIONS

Machine translation of JP 2007308745A, Nov. 2007.*
(Continued)

*Primary Examiner* — Jie Yang
(74) *Attorney, Agent, or Firm* — Westerman, Hattori, Daniels & Adrian, LLP

(57) ABSTRACT

A high-strength die-quenched part 1 is formed by heating a high-strength steel sheet 11 up to an austenite region, hot stamping and cooling inside a mold, and its microstructure has the martensite wherein carbide particles 2 are finely dispersed over an entire region including prior-austenite grain boundaries. It is desirable that the prior-austenite grain size in the microstructure of the high-strength steel sheet, which is a base material, be 10 μm or smaller. The high-strength die-quenched part has high-strength and high-ductility thanks to its martensite.

9 Claims, 19 Drawing Sheets

(51) Int. Cl.
  *B21D 22/20* (2006.01)
  *B21D 37/16* (2006.01)
  *C21D 1/42* (2006.01)
  *C22C 38/18* (2006.01)
  *C22C 38/22* (2006.01)

(52) U.S. Cl.
  CPC ............ *C21D 9/00* (2013.01); *C21D 2211/008* (2013.01); *C22C 38/18* (2013.01); *C22C 38/22* (2013.01)
  USPC .......................................... 148/576; 148/325

(56) References Cited

U.S. PATENT DOCUMENTS

| | | |
|---|---|---|
| 2007/0163685 A1 | 7/2007 | Kusumi et al. |
| 2009/0277547 A1 | 11/2009 | Saito et al. |

FOREIGN PATENT DOCUMENTS

| | | |
|---|---|---|
| JP | 2006-183139 A | 7/2006 |
| JP | 2006-265583 A | 10/2006 |
| JP | 2007-016296 A | 1/2007 |
| JP | 2007-308745 A | 11/2007 |
| JP | 4006513 B2 | 11/2007 |
| JP | 2008-038247 A | 2/2008 |
| JP | 2008-266721 A | 11/2008 |

OTHER PUBLICATIONS

Machine translation of JP 2008266721A, Nov. 2008.*
M. Hayakawa et al., "Microstructural analysis of tempered martensite with an atomic force microscope", Materia, The Japan Institute of Metals, 2004, vol. 43, No. 9, pp. 717-723, cited in spec.
International Search Report of PCT/JP2010/058915, mailing date Aug. 24, 2010.

\* cited by examiner

FIG. 10

|  | Si, Cr composition | Haeting temperature(°C) T1(/5s) | Hardness (HV) |
|---|---|---|---|
| Example 1 | 0.2Si—1Cr | 1000 | 411 |
| Example 2 | 0.2Si—2Cr | 950 | 448 |
| Example 3 | 0.2Si—3Cr | 900 | 431 |
| Example 4 | 0.2Si—4Cr | 850 | 419 |
| Example 5 | 1Si—1Cr | 1000 | 452 |
| Example 6 | 1.5Si—1Cr | 950 | 453 |
| Example 7 | 2Si—1Cr | 950 | 412 |
| Example 8 | 1Si—2Cr | 950 | 461 |
| Example 9 | 1.5Si—3Cr | 950 | 448 |
| Example 10 | 2Si—4Cr | 950 | 450 |

FIG. 11

| | Heating temperature and the prior-austenite grain size of a base material (μm) | | | | | Lowest temperature to get the full reversion into austenite phase (°C) | Ac3 transformation temperature (°C) |
|---|---|---|---|---|---|---|---|
| | 1000°C | 950°C | 900°C | 850°C | 800°C | | |
| Example 1 | 17.6 | 14.8 | 10.5 | — | | 975 | 878 |
| Example 4 | 8.8 | 7.4 | 6.2 | 5.2 | | 820 | 873 |
| Example 7 | 10.5 | 7.4 | 6.2 | | | 925 | 980 |
| Example 10 | 8.8 | 7.4 | 6.2 | 5.2 | | 925 | 972 |

HIGH-STRENGTH AND HIGH-DUCTILITY DIE-QUENCHED PARTS AND METHOD OF MANUFACTURING THE SAME

TECHNICAL FIELD

The present invention relates to a high-strength die-quenched part formed by high-ductility die quench, or hot stamping, for example, and a manufacturing method of the same.

BACKGROUND ART

Hot stamping (also called die quench or press quench) has been applied widely to manufacture structural parts of body in white in automotive vehicles. For example, a hot stamped member is manufactured as follows: After a steel sheet is heated in a furnace, the sheet is set up inside a mold by a carrier device using a robot and then shaped by pressurizing the mold. Finally the shaped sheet is quenched by the cooling mold.

However, since the microstructure of a high-strength steel sheet, in which carbon has been added intentionally, becomes so-called martensite, and thus its elongation is small. Therefore, the hot stamped members are used carefully with the load caused by possible vehicle collision taken into consideration. As a result, the use of hot stamped members is restricted in the structural parts of body in white, and the expansion of applicable sites has not yet to be achieved.

Meanwhile, tempering might be applied to improve the ductility of hot stamped members. However, this method requires longer production time and higher cost than the conventional cold stamping. In other words, the advantage of hot stamping that can manufacture highly strong members at low cost is lost.

When a hot stamped member is subjected to post processing such as punching and shear cutting, special consideration should be given to avoid the embrittlement of cutting end portion. Using laser, e.g., as post processing will do good effect but raise the processing cost significantly.

As a steel sheet for hot stamping, Patent Literature 1 discloses the use of a high-strength steel with improved toughness and ductility, whereas Patent Literature 2 discloses the use of a hot-rolled steel sheet.

PRIOR ART TECHNICAL REFERENCE

Patent Reference

Patent Literature 1: JP2007-308745A
Patent Literature 2: JP2006-265583A
Patent Literature 3: JP 4006513 B

Non-Patent Reference

Non-patent Literature 1: M. Hayakawa, S. Matsuoka, "Microstructural analysis of tempered martensite with an atomic force microscope," Materia, The Japan Institute of Metals, Vol. 43, No. 9, pp. 717-723, 2004

SUMMARY OF THE INVENTION

Problems to be Solved by the Invention

However, the high-strength steel with improved toughness and ductility according to Patent Literature 1 has the insufficient ductility after forming, and consequently its use is limited.

The hot-rolled steel sheet for hot stamping according to Patent Literature 2 is ideal for hot stamping applications with minimized hardness fluctuations, but does not have the strength comparable to a high-strength steel sheet, and is therefore inappropriate for use as a structural part of body in white of vehicles.

It is the objective of the present invention to provide a highly strong die-quenched part having high toughness and high ductility and a method of manufacturing the same.

Means for Solving the Problems

To achieve the above objective, a first embodiment of the present invention provides a high-strength die-quenched part formed by heating a high-strength steel sheet until the reversion into austenite is completed and hot stamping and cooling the same inside a mold, characterized in that the microstructure of the high-strength die-quenched part has the martensite wherein carbide particles are finely dispersed over an entire region including prior-austenite grain boundaries.

To achieve the above objective, a second embodiment of the present invention provides a high-strength die-quenched part formed by heating a high-strength steel sheet until the reversion into austenite is completed and hot stamping and cooling the same inside a mold, characterized in that the prior-austenite grain size of the high-strength steel sheet is 10 µm or smaller, and that the microstructure of the high-strength die-quenched part has the martensite wherein carbide particles are finely dispersed over an entire region including prior-austenite grain boundaries.

To achieve the above objective, a third embodiment of the present invention provides a high-strength die-quenched part formed by heating a high-strength steel sheet until the reversion into austenite is completed and hot stamping and cooling the same inside a mold, characterized in that the prior-austenite grain size of the high-strength steel sheet is 10 µm or smaller, the microstructure of the high-strength die-quenched part has the martensite wherein carbide particles are finely dispersed over an entire region including prior-austenite grain boundaries, and the dispersion coefficient of carbide particles expressed by the following formula (1), where the mean diameter of the finely dispersed carbide particles is d and the particle spacing is L, is 0.02 or higher.

$$\text{Dispersion coefficient of particles} = \text{(Square root of mean diameter of particles)}/\text{Mean spacing of particles} = (d)^{1/2}/L \quad (1)$$

In the above composition, the mean diameter of carbide particles is preferably 10 nm or larger. The carbide volume fraction preferably falls within the 1% to 10% range.

In the above composition, the high-strength steel sheet preferably contains C (carbon, the same applies hereinafter) in concentrations of 0.1 to 0.4%, Si (silicon, the same applies hereinafter) in 0.2 to 3%, and Cr (chromium, the same applies hereinafter) in 0.1 to 5%.

In the above composition, the high-strength steel sheet preferably contains C in 0.1 to 0.4%, Si in 0.2 to 3%, Cr in 0.1 to 5%, and Mo (molybdenum, the same applies hereinafter) in 0.1 to 0.5%.

In the above composition, the high-strength steel sheet preferably further contains B (boron, the same applies hereinafter) in 0.0005 to 0.005%.

According to the above composition, the microstructure of the high-strength die-quenched part has the martensite with carbide particles finely dispersed over the entire austenite grain boundaries, and consequently has high strength and high ductility.

To achieve the above objective, the present invention provides a method of manufacturing a high-strength die-quenched part, characterized in that a high-strength steel sheet is subjected to rapid heating such as electrical heating or high frequency induction heating until the reversion into austenite is completed, and then to hot stamping and cooling inside a mold.

In the above composition, the high-strength steel sheet with carbide particles finely dispersed in advance is preferably subjected to rapid heating, and then quenching from a temperature ranging from −50K to +50K of Ac3 transformation temperature of high-strength steel sheet, to allow insoluble carbide particles to remain in the high-strength die-quenched part. Rapid heating from room temperature to quenching temperature should preferably be conducted within 10 to 20 seconds.

According to the above procedure, by heating a high-strength steel sheet having the prior-austenite grain size of 10 μm or smaller, hot stamping and cooling the same inside a mold, a high strength and high ductility die-quenched part can be produced.

Effects of the Invention

As described above, according to the present invention, a high-strength die-quenched part and a method of manufacturing the same can be provided.

BRIEF DESCRIPTION OF DRAWINGS

In the drawings,

FIG. 10 is a table showing Si—Cr chemical compositions of a high-strength steel sheet, conditions of manufacturing a high-strength die-quenched part of the example using a heating device, and hardness of the high-strength die-quenched part manufactured;

FIG. 11 is a table showing the heating temperature and prior-austenite grain size (μm), lower temperature limit for full reversion into austenite phase, and Ac3 transformation temperature of examples 1, 4, 7, and 10;

DESCRIPTION OF CODES

Figure 1:
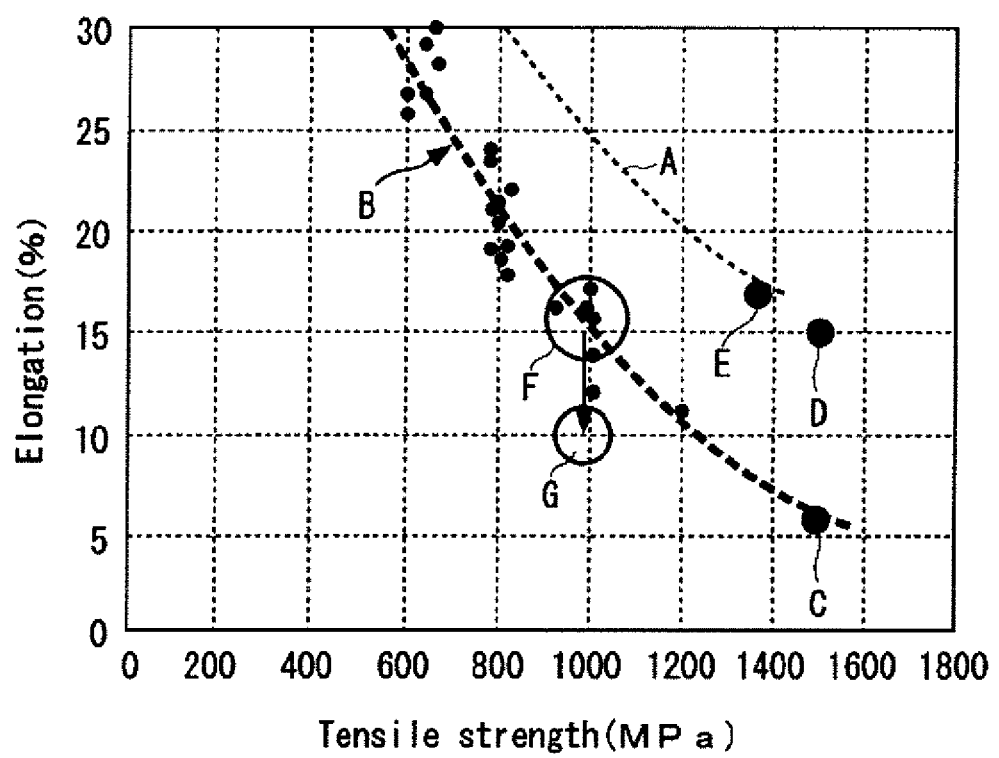
FIG. 1 is a chart illustrating the relation between tensile strength and elongation for a high-strength die-quenched part according to the embodiment of the present invention compared with that of a conventional steel sheet.

1 High-strength die-quenched part
2 Carbide particle
5 Body in white
6 Front pillar
7 Center pillar
10 Heating device (Electrical heating device)
11 High-strength steel sheet
12, 13 Electrode
14, 15 Pressure cylinder
16 Transformer
17 Thyristor
18 AC power supply
19 Output lead wire
20 Heating device (High frequency induction heating device)
21 Heating coil
22 Transformer
23 Inverter
24 High frequency induction power supply

MODES FOR CARRYING OUT THE INVENTION

The high-strength die-quenched part of the present invention will hereinafter be described in detail. Note that the percentage (%) mark denoting concentrations, contents, etc. used in this specification and the claim represents mass percentage unless otherwise specified.

The high-strength die-quenched part of the present invention is manufactured by heating a high-strength steel sheet until the reversion into austenite is completed and hot stamping and cooling the same inside a mold. The microstructure constitutes the martensite in which carbide particles are finely dispersed, and preferably the prior-austenite grain size is 10 μm or smaller.

In this case, the carbide particles are finely dispersed over an entire region including the prior-austenite grain boundaries, but the carbide does not appear in a shape of film on the prior-austenite grain boundaries.

By ensuring such the microstructure, a high-strength and high-ductility die-quenched part can be obtained.

Any heating methods can be adopted to heat the high-strength steel sheet to reach the austenite region, provided that a desired high-strength die-quenched part can be obtained. However, it is desirable that the heating temperature fall within the range approximately from −50 K to +50 K of Ac3 transformation temperature.

If the heating temperature is lower than −50K of Ac3 transformation temperature, the microstructure of the high-strength steel sheet cannot be fully reverse-transformed, and thus a high-strength die-quenched part having a good ductility can hardly be obtained.

On the other hand, if the heating temperature is higher than +50K of Ac3 transformation temperature, the insoluble carbide particles remaining in the microstructure of the high-strength steel sheet decreases significantly, which is undesirable.

The microstructure of the high-strength die-quenched part obtained by hot stamping and cooling a high-strength steel sheet inside a mold constitutes the martensite having the fine prior-austenite grain size of 10 μm or smaller.

Surprisingly, the carbide in this martensite does not appear in a shape of film on the prior-austenite grain boundaries, unlike conventional microstructures, but the carbide particles were found to be dispersed finely over an entire region of the microstructure including the prior-austenite grain boundaries. Consequently, a high-strength die-quenched part having excellent ductility can be obtained.

Elements constituting a high-strength steel sheet will hereinafter be described.

About Constituent Element C (Carbon)

C is an element most effective at enhancing strength. To obtain the strength of 980 MPa or higher, it is appropriate to contain C in concentrations of 0.1% or higher. However, if the content exceeds 0.4%, degradation in toughness tends to result, and so the content was determined to fall within the range from 0.1 to 0.4%.

About Constituent Element Si (Silicon)

Si is an element effective at deoxidizing and enhancing strength. Consequently, it is desirable that Si be contained in concentrations of 0.2% or higher including Si added as a deoxidizing agent and remaining in the steel. It is desirable, however, that the upper limit be 3% because the excessive addition may cause degradation in toughness.

About Constituent Element Cr (Chromium)

Cr is an element effective at improving hardenability, and also at enhancing the strength of a steel sheet when replacing iron within cementite. To ensure hardenability and strength, the concentration of Cr was determined to be 0.1% or higher. Meanwhile, if an excessive amount of Cr is added, the effect is saturated and the toughness decreases. Consequently, the upper concentration limit was determined to be 5%.

About Constituent Element Mo (Molybdenum)

Mo is an important element for a high-strength steel sheet to be used, and effective at generating martensite stably by cooling after the heating of the steel sheet. Mo is also effective at refining prior-austenite grains as a result of formation of alloy carbide. Such effect can be obtained if Mo is contained in concentrations of 0.1% or higher. Meanwhile, since Mo is an expensive alloy element, its concentrations were determined to fall within the 0.1 to 0.5% range.

About Constituent Element B (Boron)

B is an element effective at improving hardenability. To ensure favorable hardenability and strength, B was determined to be contained in concentrations of 0.0005% or higher. Meanwhile, if B is added excessively, its effect is saturated, and at the same time toughness decreases, and so the upper limit of its concentrations was determined to be 0.005%.

By allowing the microstructure of the high-strength steel sheet before hot stamping to be martensite, in which alloy carbide particles are finely dispersed, the alloy carbide particles in the high-strength die-quenched part obtained after reheating and cooling are made to have uniform and fine distribution over the entire microstructure, and thus improved ductility is ensured. However, if the particle size of alloy carbides is less than 0.01 μm, such effect cannot be expected, and if the particle size becomes as coarse as 5 μm, the ductility decreases.

According to the present invention, it is desirable that the prior-austenite grain size in the microstructure of the high-strength die-quenched part be 10 μm or smaller to further improve ductility. If the prior-austenite grain size exceeds 10 μm, the effect of improving formability such as deep drawability, stretchability, and shape freezing property decreases.

To the high-strength steel sheet, various elements other than those described above can be added within a range not interfering with the intended effect.

Good examples of the high-strength steel sheet include the one wherein C is contained in concentrations of 0.1 to 0.4%, Si of 0.2 to 3%, and Cr of 0.1 to 5%, with the remaining portion virtually being iron (Fe) and unavoidable impurities. These high-strength steel sheets may have a microstructure with Mo added to the above microstructure. For example, the high-strength steel sheet may contain C in concentrations of 0.1 to 0.4%, Si of 0.2 to 3%, Cr of 0.1 to 5%, and Mo of 0.1 to 0.5%, with the remaining portion virtually being Fe and unavoidable impurities. These high-strength steel sheets can further contain B in concentrations of 0.0005 to 0.005%, in addition to the above microstructure. The microstructure of the high-strength steel sheet may not necessarily be limited to the microstructures described above.

Next, a method of manufacturing the high-strength die-quenched part of the present invention will hereinafter be described in detail.

As described above, the method of manufacturing the high-strength die-quenched part includes rapid heating of a high-strength steel sheet by subjecting the same to electrical or high frequency induction heating using a heating device, which will be described later, and hot stamping and cooling the same inside a mold.

By employing such a method, the steel sheet can be heated uniformly, accurately in terms of temperature in a short time, and in a state wherein oxidation of the surface of the steel sheet is suppressed. However, the high-strength die-quenched part of the present invention is not limited to those manufactured by this method.

FIG. 1 is a chart illustrating the relation between tensile strength and elongation for a high-strength die-quenched part according to the embodiment of the present invention compared with that of a conventional steel sheet.

As shown in FIG. 1, the high-strength die-quenched part manufactured by the above method has much higher tensile strength and elongation (see symbol A) compared to those of conventional steel sheet as shown by symbol B in FIG. 1. The hot stamped (die-quenched) member obtained by processing a conventional steel sheet has the high-strength of approximately 1500 MPa as shown by symbol C, but its elongation remains slightly above 5%. Meanwhile, the high-strength die-quenched part according to the embodiment of the present invention has the elongation of over 15% while maintaining the tensile strength of approximately 1500 MPa, or slightly lower than 1400 MPa as shown by symbols D and E.

With the existing so-called 980 MPa steel sheet (see symbol F), since the elongation after cold stamping (see symbol G) is approximately 10%, the high-strength die-quenched part according to the embodiment of the present invention can also be applied to parts where a conventional 980 MPa steel sheet is used.

With the high-strength die-quenched part according to the embodiment of the present invention, the lower the maximum heating temperature, the finer the prior-austenite grain size, which is characteristics of a microstructure. In this case, the prior-austenite grain size of the steel sheet before die quench is smaller than 10 μm.

Figure 2:
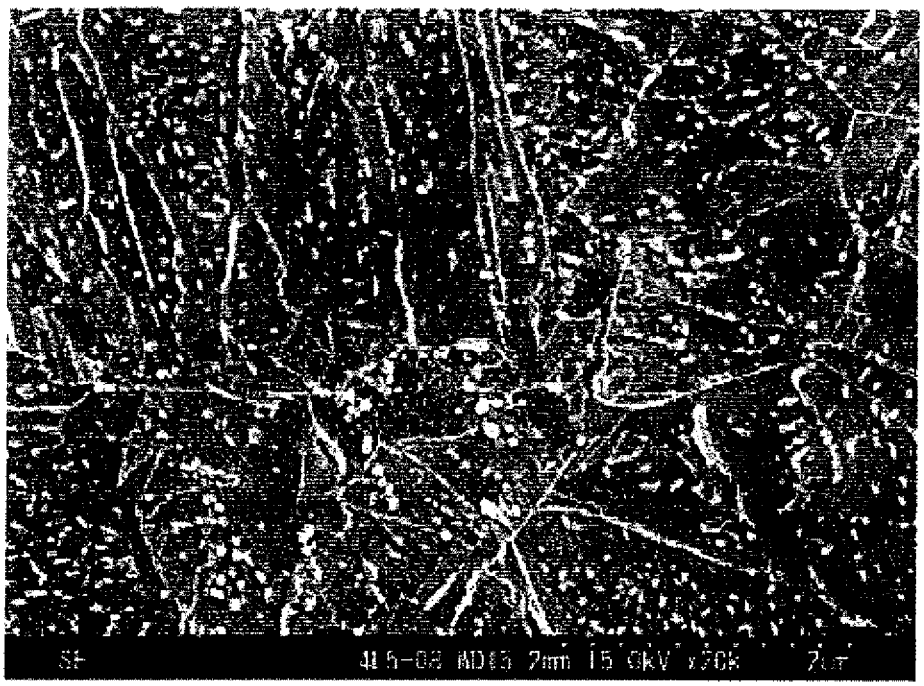
FIG. 2 presents an image of insoluble carbide particles finely dispersed at a relatively low heating temperature in an example of high-strength die-quenched part according to the embodiment of the present invention.

FIG. 2 presents an electron microscopic image of insoluble carbide particles finely dispersed in an example of high-strength die-quenched part according to the embodiment of the present invention when the heating temperature is low. The electron accelerating voltage is 15 kV, and the magnification is 20,000 times.

As shown in FIG. 2, the prior-austenite grain size of the high-strength die-quenched part is approximately 3 μm, for example. The white dots shown in FIG. 2 are carbide particles dispersed in the martensite. It is apparent that the carbides have not appeared in a shape of film on the prior-austenite grain boundaries, but dispersed finely over an entire region of the microstructure including the prior-austenite grain boundaries. In other words, with the microstructure of the high-strength die-quenched part according to the present invention, carbide particles are finely dispersed over the range including the prior-austenite grain boundaries, which is a characteristic not achievable with conventional technologies. Conventionally, it was difficult to suppress the carbide formation in a shape of film on prior-austenite grain boundaries.

If the heating temperature is high, insoluble carbide particles are not allowed to remain in the microstructure of the high-strength die-quenched part.

The state of dispersion of carbide particles in a high-strength die-quenched part, wherein the carbide particles are finely dispersed in martensite, will be described below.

Assuming the mean diameter of dispersed carbide particles as d and the mean spacing of particles as L, the dispersion coefficient of carbide particles is defined by formula (1) shown below:

Dispersion coefficient of particles=(Square root of mean diameter of particles)/mean spacing of particles=$(d)^{1/2}/L$ (1)

The dispersion coefficient of particles is proportional to the strain hardening rate according to the Ashby's strain hardening theory.

"Fine" in the expression "finely dispersed" means that the dispersion coefficient of carbide particles expressed by formula (1) is 0.02 or higher.

Figure 3:
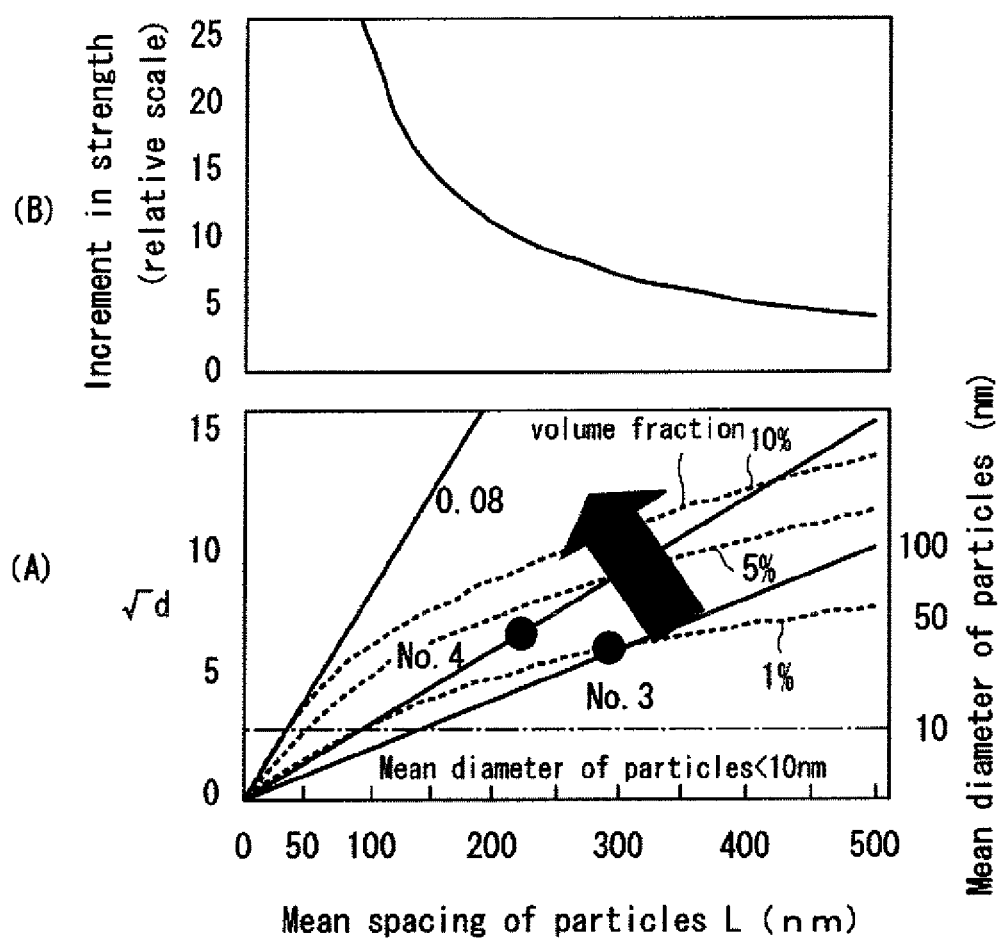
FIG. 3(A) is a chart representing formula (1)
FIG. 3(B) is a chart illustrating the relation between increment in strength and mean spacing of carbide particles L.

FIG. 3(A) is a chart representing formula (1), and FIG. 3(B) illustrates the relation between increment in strength and mean spacing of particles L. The horizontal axis represents the mean spacing of particles L (nm). The vertical axis of FIG. 3(A) represents $(d)^{1/2}$, and the vertical axis of FIG. 3(B) represents the increment in strength (relative scale).

In FIG. 3(A), formula (1) is expressed by slopes from the origin of coordinates. The strain hardening rate is proportional to the gradient of each slope. Consequently, if carbide particles are dispersed, allowing the gradient of slope to be steeper, namely allowing the dispersion coefficient of particles to increase, higher ductility can be obtained. Particle volume fraction is shown by dotted lines. Too large particle volume fraction may cause ductility to decrease, whereas too small particle volume fraction does not allow the effect of improved strain hardening rate to be exerted, and thus ductility cannot be improved. The upper limit should therefore be 10%, and at least 1% is desirable. If the mean diameter of particles is 10 nm or smaller, the ability of high-strength die-quenched part to withstand stress cannot be expected to increase. To increase the ability to withstand stress, the mean diameter of particles should be 10 nm or larger.

As shown in FIG. 3(B), the increment in strength due to particle dispersion depends only on the mean spacing of particles, and the smaller the mean spacing of particles, the larger the increment in strength. Consequently, the dispersion coefficient of particles shown above should be 0.02 or higher.

(Method of Measuring the Dispersion Coefficient of Particles)

Figure 4:
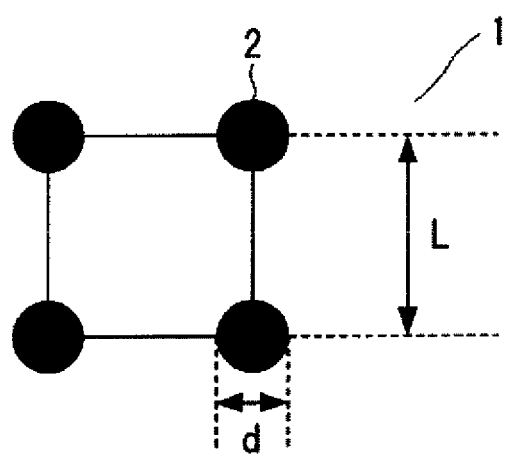
FIG. 4 graphically represents the state of dispersion of carbide particles.

The dispersion coefficient of particles can be measured, following the procedure shown below:

(a) Observe the microstructure of the high-strength die-quenched part with an electron microscope. The magnification should be 20,000 times, for example. FIG. 4 graphically represents the state of dispersion of carbide particles. As shown, carbide particles 2 are dispersed in the high-strength die-quenched part 1. By the linear intercept method shown in FIG. 4, find the diameter d of dispersed carbide 2 particles and mean spacing of particles L. In this case, observation should be conducted, excluding particles having particle diameter of 10 nm or smaller (d<10 nm). The sample surface for microstructure observation of the high-strength die-quenched part under the electron microscope can be flattened by the electropolishing method disclosed in Patent Literature 3 and Non-patent Literature 1.

(b) Find the mean diameter of particles d and mean spacing L of carbide particle 2 per each field of view.

The average value for each of the plurality of fields of view exhibiting so-called bimodal distribution should be excluded.

(c) Calculate the dispersion coefficient of particles by finding the average value of at least three fields of view.

The mean diameter of particles d and mean spacing of particles L found by formula (1) and the above measurement method is effective only to find the dispersion coefficient of particles that is to be used as an indicator for ensuring high ductility.

The high-strength die-quenched part according to the embodiment of the present invention is applicable to various mechanical parts such as various parts for transporting vehicles, for example. Such parts include various pillars used in body structures, reinforcing materials for bumpers, reinforcing materials for door guards such as guard bars, etc.

Figure 5:
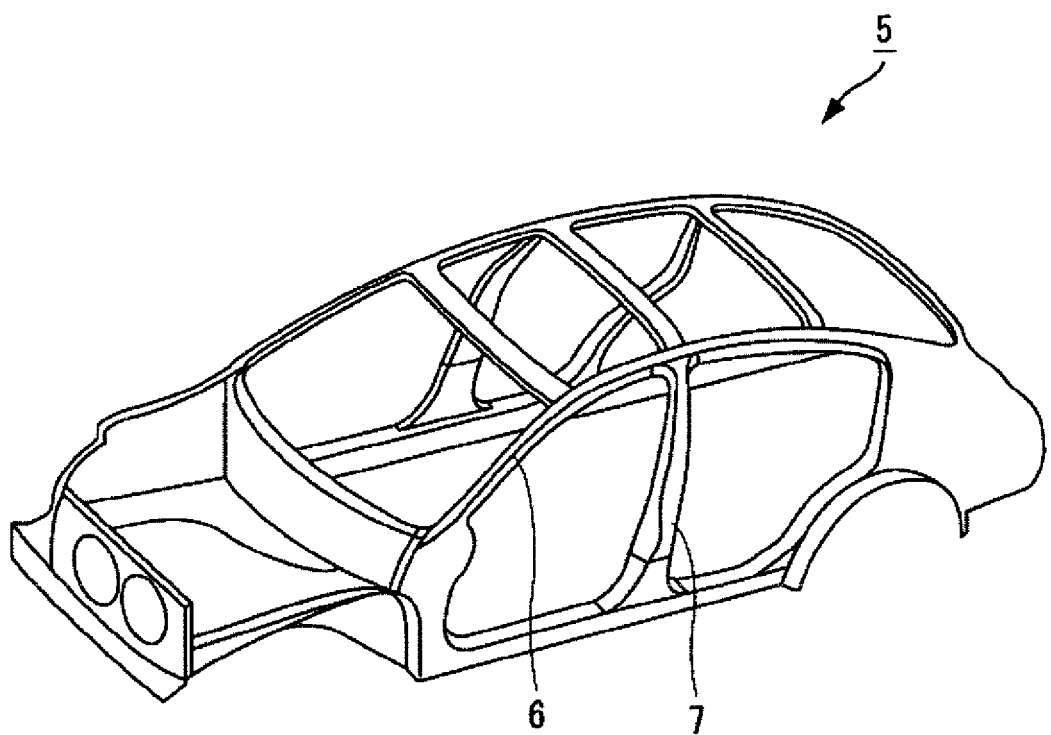
FIG. 5 is an oblique perspective view showing a body in white of an automobile as a typical application of the high-strength die-quenched part according to the embodiment of the present invention.

FIG. 5 is an oblique perspective view showing the body structure of an automobile as an example of application of the high-strength die-quenched part according to the embodiment of the present invention. The high-strength die-quenched part according to the embodiment of the present invention can be used preferably for pillars requiring substantial strength, front pillar 6 and center pillar 7 in particular, of the body structure 5.

Figure 6:
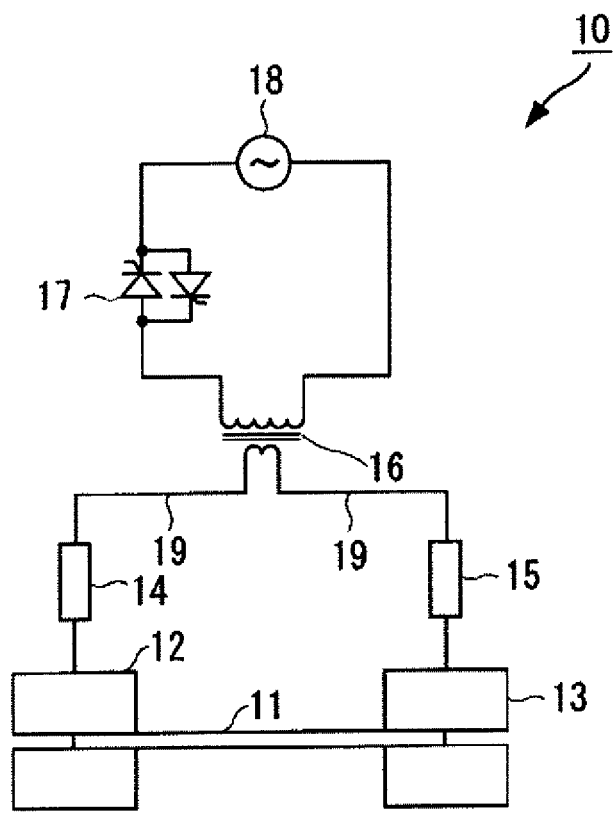
FIG. 6 is a diagram illustrating a typical configuration of a heating device for electrical heating used for manufacturing a high-strength die-quenched part according to the embodiment of the present invention.

FIG. 6 is a diagram illustrating a typical configuration of a heating device for electrical heating used for manufacturing a high-strength die-quenched part according to the embodiment of the present invention.

The heating device 10 shown in FIG. 6 includes two electrodes 12, 13, each of which being structured to be capable of sandwiching at both ends a high-strength steel sheet 11 to be heated, pressure cylinders 14, 15 used to pressurize these electrodes 12, 13 respectively, a transformer 16 secondary side of which is connected to these electrodes 12, 13, and an AC power supply 18 connected to this transformer 16 on the primary side via a thyristor 17 for phase control.

The phase of the AC power supply 18 is controlled with the thyristor 17, power control is performed for the electrodes 12, 13 via the transformer 16, and power is fed to the high-strength steel sheet 11.

The high-strength steel sheet 11 should measure 400 mm in width, 800 mm in length, and 1.6 mm in height, for example. By heating this high-strength steel sheet 11 at the electrical current of 20000 A and operate time of 10 seconds, the high-strength steel sheet 11 is heated up to approximately 950° C. for example, in a state pressurized by the pressurizing cylinder 14, 15.

To heat the high-strength steel sheet uniformly, it is desirable that the outward and return lengths from the output lead wire 19 of the transformer 16 to the high-strength steel sheet 11 be the same. To achieve this, the transformer 16 is placed above the high-strength steel sheet 11, with the length of the output lead wires 19 on left and right maintained the same. By installing wires in this way, the current density of the output lead wire 19 remains the same at each point, and thus current can be fed to the high-strength steel sheet 11 uniformly to ensure uniform temperature of the high-strength steel sheet 11.

Figure 7:
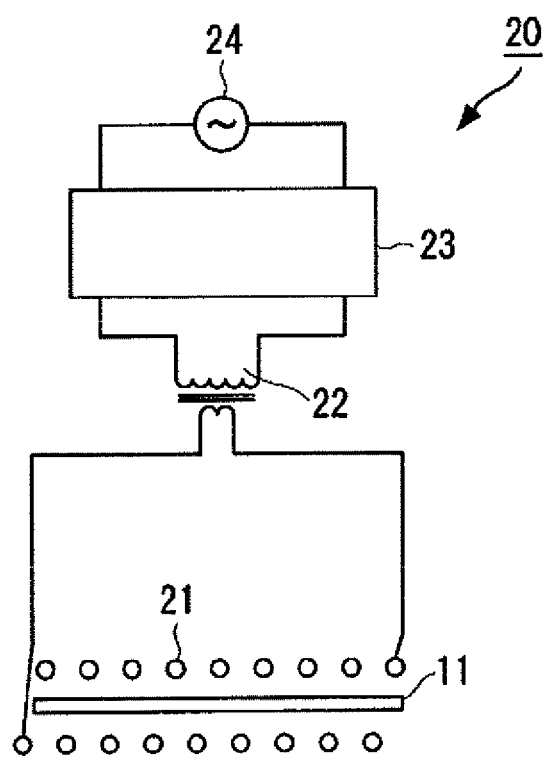
FIG. 7 is a diagram illustrating a typical configuration of a heating device for high frequency induction heating used for manufacturing a high-strength die-quenched part according to the embodiment of the present invention.

FIG. 7 is a diagram illustrating a typical configuration of a heating device for high frequency induction heating used for manufacturing a high-strength die-quenched part according to the embodiment of the present invention.

The heating device 20 shown in FIG. 7 includes a heating coil 21, a transformer 22, the secondary side of which is connected to the heating coil 21, an inverter 23 for feeding power to the primary side of this transformer 22, and a high frequency induction power supply 24 for feeding power to the inverter 23.

In this case, the heating coil 21 is preferably wound more densely at both ends compared to the central portion so that the high-strength steel sheet 11 is heated uniformly up to its both ends.

The high frequency induction current supplied from the high frequency induction power supply 24 via the inverter 23 is fed to the heating coil 21 via the transformer 22 to subject the high-strength steel sheet 11 placed in the heating coil 21 to high frequency induction heating.

By conducting high frequency induction heating at the power frequency of 400 kHz, the power capacity of 500 kW, and the operate time of 10 seconds, the high-strength steel sheet 11 is heated up to approximately 950° C., for example. In this case, compared to the conventional heating method in hot stamping, namely heating performed with the high-strength steel sheet sandwiched between heated steel materials, heating can be conducted more rapidly.

The high-strength steel sheet 11, which has been rapidly heated up to approximately 950° C. with the heating device 10 or 20, is placed inside a mold for pressing with a robot, etc. to subject the same to hot stamping and cooling, and a high-strength die-quenched part having high ductility can thus be manufactured.

Figure 8:
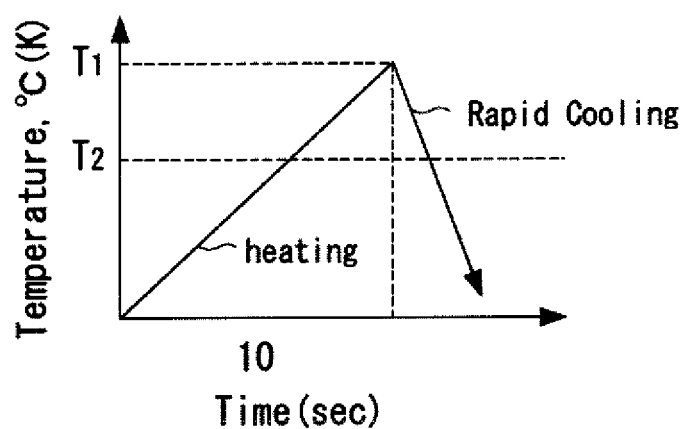
FIG. 8 is a chart showing the state of quenching performed using the heating device shown in FIG. 7.

FIG. 8 is a chart showing the state of heating for quenching performed using the heating device 20 shown in FIG. 7. In the heating cycle shown in FIG. 8, the high-strength steel sheet is rapidly heated up to temperature T1 within 10 seconds using the heating device 20, and in air or in an inert gas atmosphere at a given pressure, placed inside a mold and shaped by pressurizing the mold, and cooled down in the mold for quenching. As an inert gas, helium (He) and nitrogen can be used. The pressure is 0.5 MPa, for example.

Figure 9:
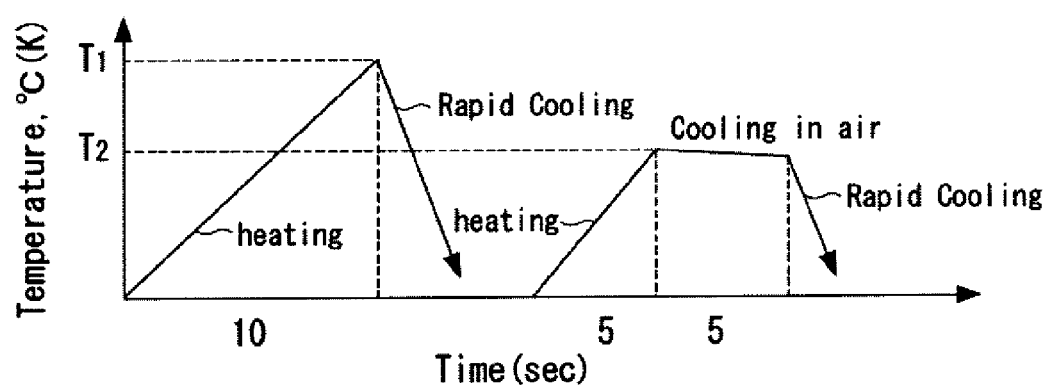
FIG. 9 is a chart showing a variation of quenching performed using the heating device shown in FIG. 7.

FIG. 9 is a chart showing a variation of quenching performed using the heating device 20 shown in FIG. 7. After quenching is performed by the same method shown in FIG. 7, the high-strength steel sheet is heated again up to a temperature T2 within five seconds using the heating device 20, cooled down in air for five seconds, and then in air or in an inert gas atmosphere at a given pressure, placed in a mold, shaped by pressuring the mold, and cooled down in the mold for quenching. As an inert gas, He or nitrogen can be used. The pressure is 0.5 MPa, for example.

EXAMPLE 1

The examples of the present invention will hereinafter be described further in detail, but note that the present invention is not limited to these examples.

The base material of the high-strength die-quenched part is a high-strength steel sheet containing 0.18% C, 0.4% Mn, and 0.30% Mo, which is common to each example. A high-strength steel sheet further containing Si and Cr is also used. The high-strength steel sheet measures 400 mm in width, 800 mm in length, and 1.6 mm in height. The high-strength die-quenched part of each example was manufactured by the heating method shown in FIG. 8 or FIG. 9.

FIG. 10 is a table showing the Si—Cr composition of the high-strength steel sheet, manufacturing conditions of high-strength die-quenched part of the example using the heating device 20, and hardness of the high-strength die-quenched part manufactured.

With the high-strength steel sheet in example 1, 0.2% Si and 1% Cr were added to the above composition. Heating was conducted for five seconds until T1 of 1000° C. was reached for die quench to manufacture the high-strength die-quenched part. The hardness of this high-strength die-quenched part was 411 HV.

EXAMPLE 2

With the high-strength steel sheet in example 2, 0.2% Si and 2% Cr were added to the above composition. Die quench was performed with T1 set at 950° C. as in the case of example 1 to manufacture a high-strength die-quenched part. The hardness of this high-strength die-quenched part was 448 HV.

EXAMPLE 3

With the high-strength steel sheet in example 3, 0.2% Si and 3% Cr were added to the above composition. Die quench was performed with T1 set at 900° C. as in the case of example 1 to manufacture a high-strength die-quenched part. The hardness of this high-strength die-quenched part was 431 HV.

EXAMPLE 4

With the high-strength steel sheet in example 4, 0.2% Si and 4% Cr were added to the above composition. Die quench was performed with T1 set at 850° C. as in the case of example 1 to manufacture a high-strength die-quenched part. The hardness of this high-strength die-quenched part was 419 HV.

EXAMPLE 5

With the high-strength steel sheet in example 5, 1.0% Si and 1% Cr were added to the above composition. Die quench was performed with T1 set at 1000° C. as in the case of example 1 to manufacture a high-strength die-quenched part. The hardness of this high-strength die-quenched part was 452 HV.

EXAMPLE 6

With the high-strength steel sheet in example 6, 1.5% Si and 1% Cr were added to the above composition. Die quench was performed with T1 set at 950° C. as in the case of example 1 to manufacture a high-strength die-quenched part. The hardness of this high-strength die-quenched part was 453 HV.

EXAMPLE 7

With the high-strength steel sheet in example 7, 2.0% Si and 1% Cr were added to the above composition. Die quench was performed with T1 set at 950° C. as in the case of example 1 to manufacture a high-strength die-quenched part. The hardness of this high-strength die-quenched part was 412 HV.

EXAMPLE 8

With the high-strength steel sheet in example 8, 1.0% Si and 2% Cr were added to the above composition. Die quench was performed with T1 set at 950° C. as in the case of example 1 to manufacture a high-strength die-quenched part. The hardness of this high-strength die-quenched part was 461 HV.

EXAMPLE 9

With the high-strength steel sheet in example 9, 1.5% Si and 3% Cr were added to the above composition. Die quench was performed with Ti set at 950° C. as in the case of example 1 to manufacture a high-strength die-quenched part. The hardness of this high-strength die-quenched part was 448 HV.

EXAMPLE 10

With the high-strength steel sheet in example 10, 2.0% Si and 4% Cr were added to the above composition. Die quench was performed with T1 set at 950° C. as in the case of example 1 to manufacture a high-strength die-quenched part. The hardness of this high-strength die-quenched part was 450 HV.

The hardness obtained in each example was good with respect to the target hardness of 420 to 450 Hv except for example 1.

FIG. 11 is a table showing the heating temperature and the prior-austenite grain size of a base material (μm), the lowest temperature to get the full reversion into austenite phase, and Ac3 transformation temperature of examples 1, 4, 7, and 10.

In example 1, the prior-austenite grain size at the heating temperature of 900° C., 950° C., and 1000° C. was 10.5 μm, 14.8 μm, and 17.6 μm respectively. The lowest temperature to get the full reversion into austenite phase was 975° C., and Ac3 transformation temperature was 878° C.

In example 4, the prior-austenite grain size at the heating temperature of 850° C., 900° C., 950° C. and 1000° C. was 5.2 μm, 6.2 μm, 7.4 μm and 8.8 μm respectively. The lowest temperature to get the full reversion into austenite phase was 820° C., and Ac3 transformation temperature was 873° C.

In example 7, the prior-austenite grain size at the heating temperature of 900° C., 950° C., and 1000° C. was 6.2 μm, 7.4 μm, and 10.5 μm respectively. The lowest temperature to get the full reversion into austenite phase was 925° C., and Ac3 transformation temperature was 980° C.

In example 10, the prior-austenite grain size at the heating temperature of 850° C., 900° C., 950° C. and 1000° C. was 5.2 μm, 6.2 μm, 7.4 μm and 8.8 μm respectively. The lowest temperature to get the full reversion into austenite phase was 925° C., and Ac3 transformation temperature was 972° C.

The relation between tensile strength and elongation in examples 1 to 10 was examined.

Figure 12:
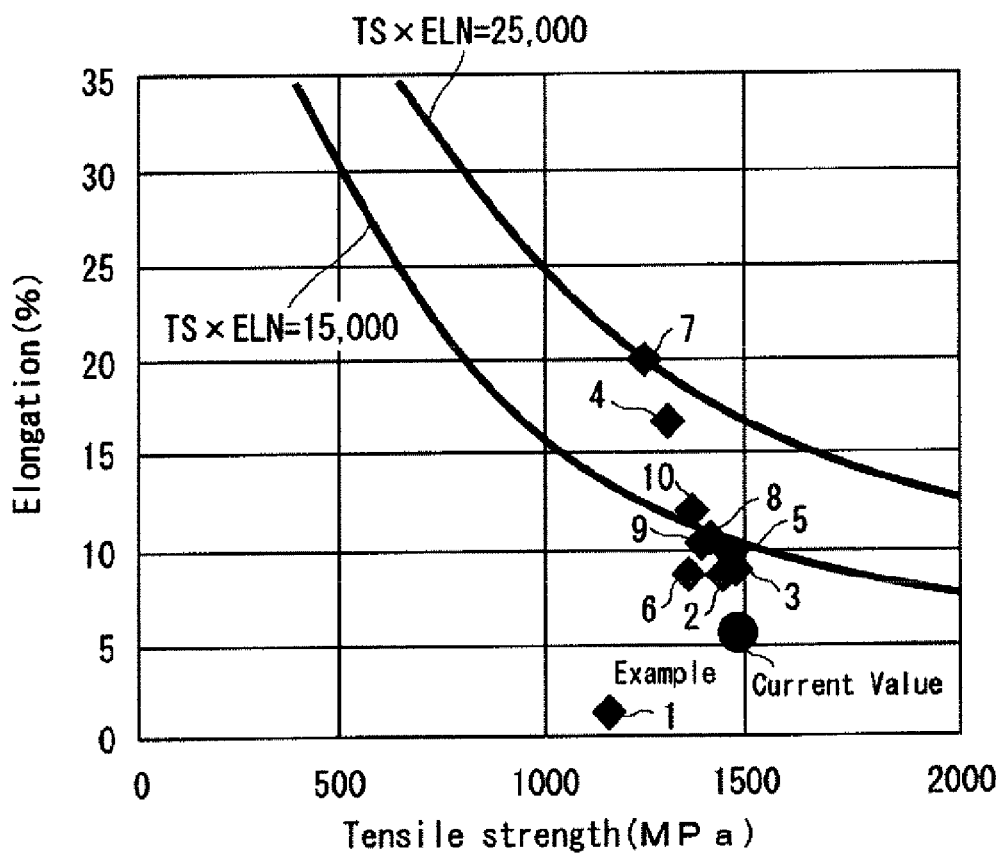
FIG. 12 is a chart illustrating the relation between tensile strength and elongation in examples 1 to 10.

FIG. 12 is a chart illustrating the relation between tensile strength and elongation of examples 1 to 10. The horizontal axis of FIG. 12 represents tensile strength (MPa), and the vertical axis represents elongation (%). Here the tensile strength (TS) means that of the bottom portion of press punch was measured by a tensile test conforming to JIS Z2241 using a JIS Z2201 No. 5 test piece.

As shown in FIG. 12, compared to the hot stamped member using a conventional steel sheet, higher elongation, thus improved ductility, was confirmed. In examples 4 and 7 in particular, the elongation of 15% or higher was measured, which confirms that favorable ductility was ensured.

In example 1, since the quenching temperature was as high as 1000° C. with respect to Ac3 transformation temperature of 878° C., insoluble carbide particles did not remain. In addition, since the prior-austenite grain size was 10 μm or larger, ductility was considered to be low.

Meanwhile, in examples 3, 4, 6, 7, 9, and 10, the quenching temperature T1 fell within the range from −50 K to +50 K of Ac3 transformation temperature.

More specifically, as shown in FIG. 12, tensile strength (TS)×elongation (ELN) was rather low in example 1, whereas in examples 4 and 7, approximately 25000 was maintained, and 15000 was maintained in examples 2, 3, 5, 6, and 8 to 10.

The result of tensile test and the microstructure after hot stamping in examples 3, 4, and 10 will then be described. Tensile tests were conducted using plate-shaped test pieces (No. 5 or No. 13 test piece specified in JIS Z 2201, for example), and a stress-strain chart was created.

Figure 13:
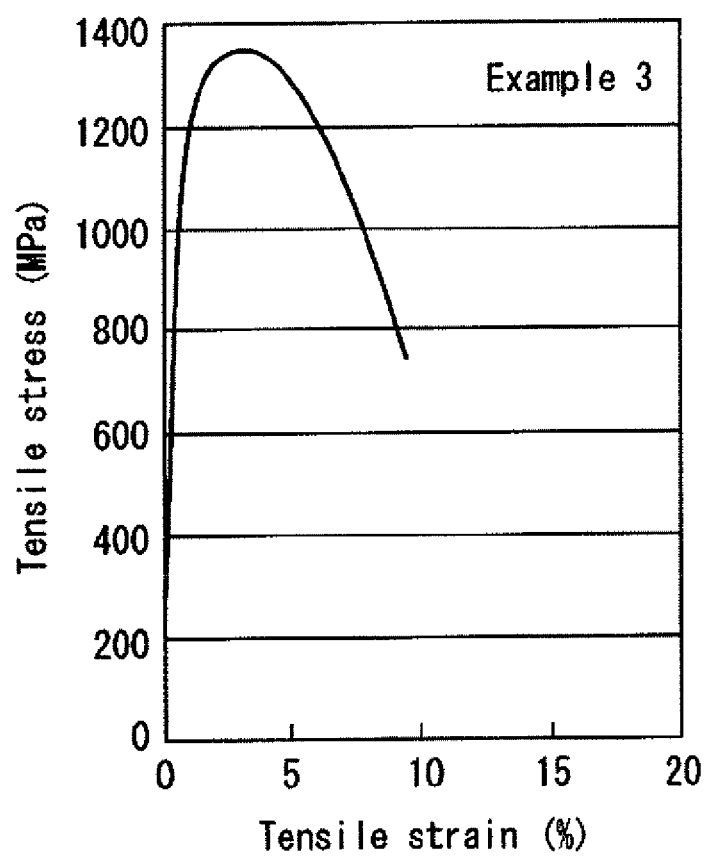
FIG. 13 is a chart showing the stress-strain curve of the high-strength die-quenched part in example 3.

FIG. 13 is a chart showing the stress-strain curve of the high-strength die-quenched part in example 3. The horizontal axis in FIG. 13 represents tensile strain (%), and the vertical axis represents tensile stress (MPa). As shown in FIG. 13, the high-strength die-quenched part in example 3 exhibited uniform elongation up to high tensile stress of exceeding 1300 MPa, and then ruptured at the tensile strain of slightly lower than 10%.

Figure 14:
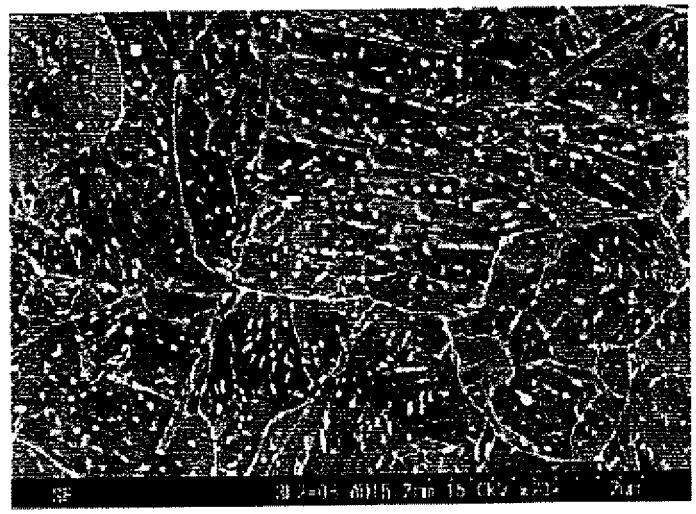
FIG. 14 is an electron microscopic image of the microstructure of the high-strength die-quenched part in example 3.

FIG. 14 is an electron microscopic image of the microstructure with the magnification of 20000 for the high-strength die-quenched part in example 3, with electron-accelerating voltage maintained at 15 kV. FIG. 14 presents martensite wherein carbide particles are finely dispersed. It is also apparent, as in the case of the microstructure shown in FIG. 2, that the carbide particles do not appear in a form of film on prior-austenite grain boundaries, and that the carbide particles are finely dispersed over an entire region of the microstructure including the prior-austenite grain boundaries.

In example 3, quenching was performed, as shown in FIG. 10, at temperature T1 (900° C.), which was higher than Ac3 transformation temperature (868° C.).

Figure 15:
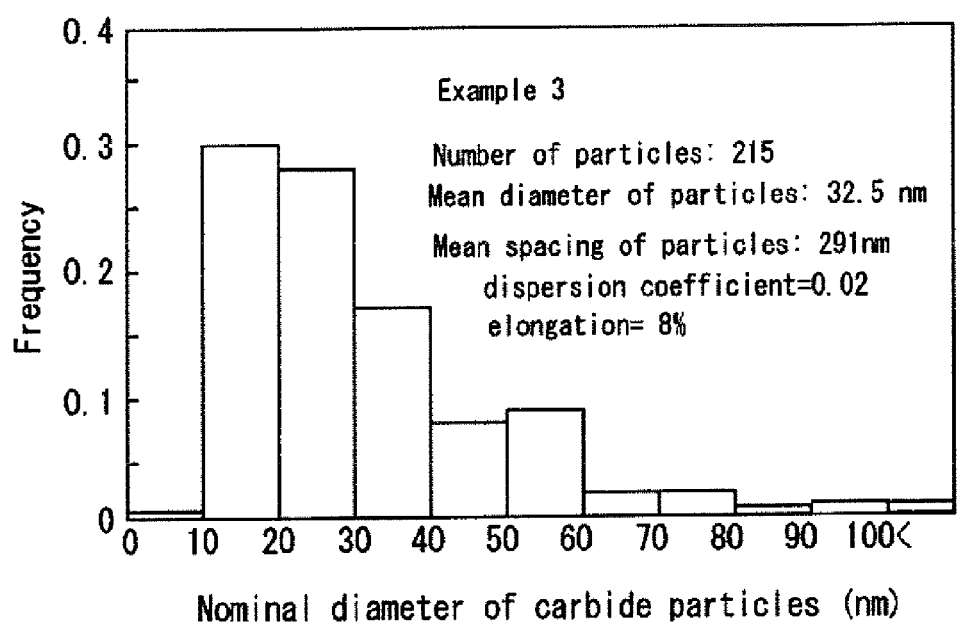
FIG. 15 is a chart showing the result of particle diameter dispersion of the high-strength die-quenched part in example 3.

FIG. 15 is a chart showing the result of particle diameter dispersion of the high-strength die-quenched part in example 3. The horizontal axis of FIG. 15 represents the nominal diameter of carbide particles (nm), and the vertical axis represents the frequency.

Measurement results are shown below:
Number of particles: 215
Mean diameter of particles d: 32.5 nm
Mean spacing of particles L: 291 nm The dispersion coefficient of particles was found to be 0.02 from the mean diameter of particles d and mean spacing of particles L. The elongation of this sample at rupture was 8%.

Figure 16:
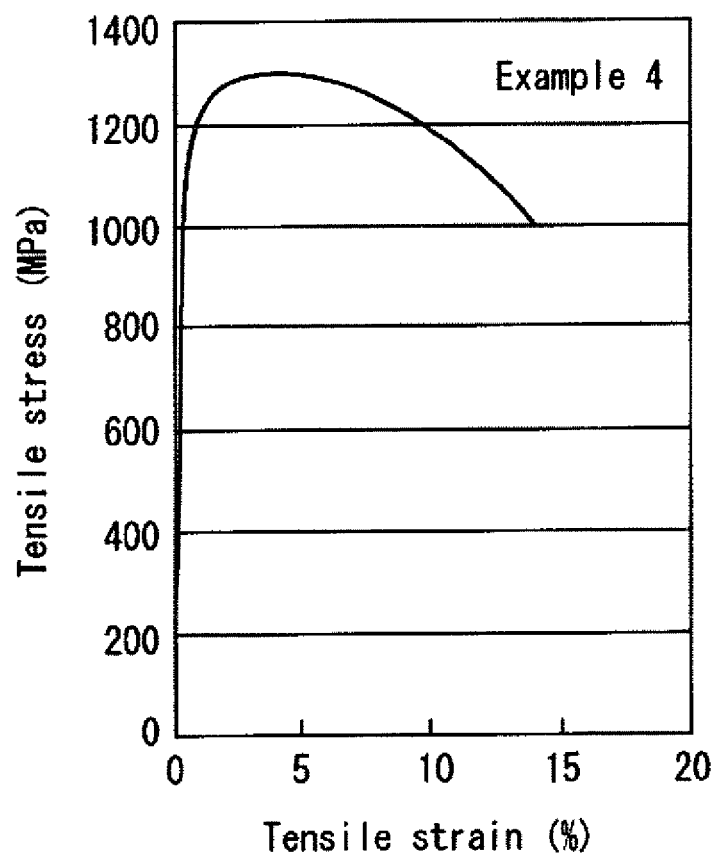
FIG. 16 is a chart showing the stress-strain curve of the high-strength die-quenched part in example 4.

FIG. 16 is a chart showing the stress-strain curve of the high-strength die-quenched part in example 4. The horizontal and vertical axes of FIG. 16 represent the same items in FIG. 13. As shown in FIG. 16, the high-strength die-quenched part in example 4 exhibited uniform elongation up to the tensile stress exceeding 1300 MPa, and then ruptured at the tensile strain of 16%. The test piece in example 4 was thus found to have high ductility.

In the microstructure of the test piece in example 4 also, the martensite wherein carbide particles are finely dispersed was found to have been formed. It was found that the carbide particles did not appear on the prior-austenite grain boundaries in a shape of film, and that the carbide particles had been finely dispersed over an entire region of the microstructure including the prior-austenite grain boundaries (FIG. 2).

In example 4, as shown in FIG. 10, quenching was performed at temperature T1 (850° C.), which is lower than the Ac3 transformation temperature (873° C.) but higher than the lowest temperature to get the full reversion into austenite phase of 820° C., and the prior-austenite grain size was 5.2 μM.

Figure 17:
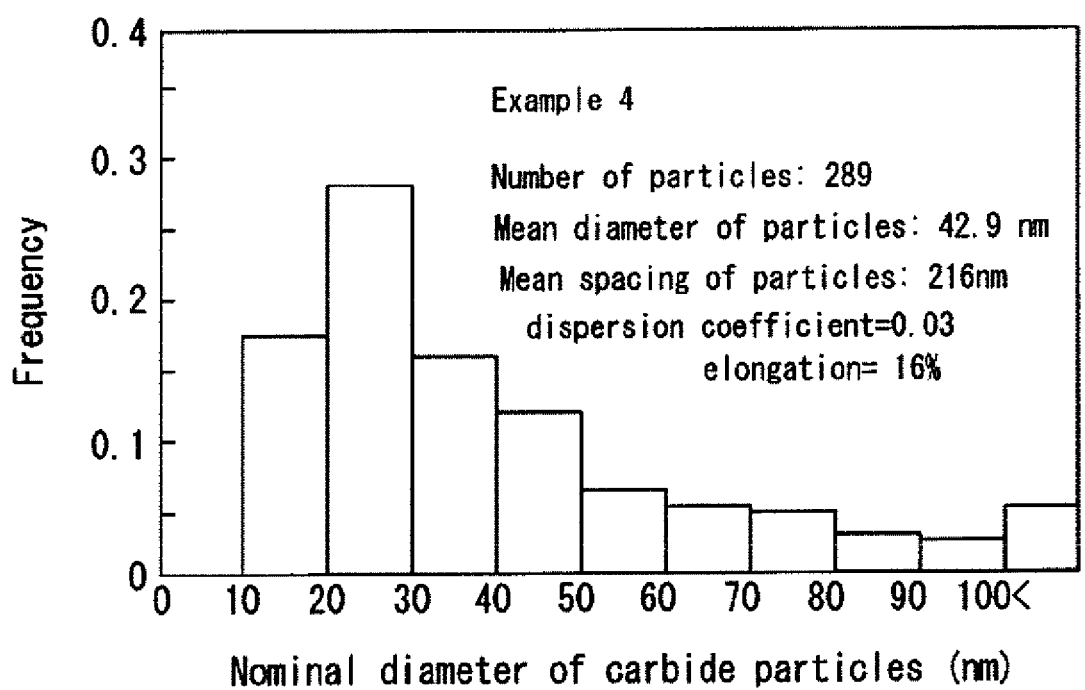
FIG. 17 is a chart showing the result of particle diameter dispersion of the high-strength die-quenched part in example 4.

FIG. 17 is a chart showing the result of particle diameter dispersion of the high-strength die-quenched part in example 4. The horizontal and vertical axes represent the same items as FIG. 15.

The measurement results are shown below:
Number of particles: 289
Mean diameter of particles d: 42.9 nm
Mean spacing of particles L: 216 nm The dispersion coefficient of particles was found to be 0.03 from the mean diameter of particles d and mean spacing of particles L. The elongation of this sample was 16%. The dispersion coefficient of particles in Example 4 was higher than that of example 3, and consequently the elongation at rupture was found to be twice as large as that of example 3. From the above, it was found that the dispersion coefficient of particles expressed by formula (1) was effective at assessing the ductility of high-strength die-quenched parts.

Figure 18:
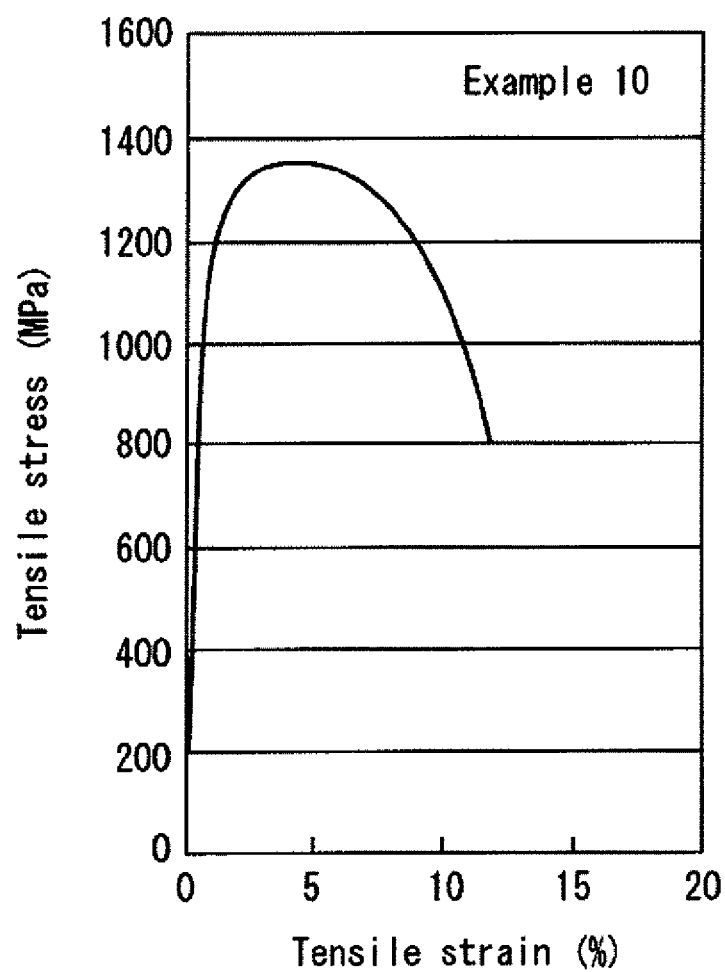
FIG. 18 is a chart showing the stress-strain curve of the high-strength die-quenched part in example 10.

FIG. 18 is a chart showing the stress-strain curve of the high-strength die-quenched part in example 10. The horizontal and vertical axes represent the same items in FIG. 13. As shown in FIG. 18, the high-strength die-quenched part in example 10 exhibited uniform elongation up to the tensile stress exceeding 1300 MPa, and then ruptured at the tensile strain slightly lower than 13%, which indicates that the test piece in example 10 also had high ductility.

Figure 19:
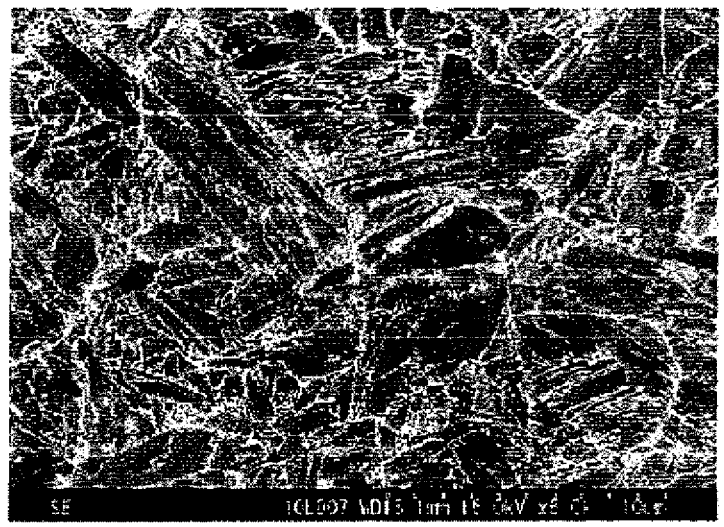
FIG. 19 is an electron microscopic image of the microstructure of the high-strength die-quenched part in example 10.

FIG. 19 is an electron microscopic image of the microstructure with the magnification of 5000 for the high-strength die-quenched part in example 10, with the electron accelerating voltage maintained at 15 kV. As shown in FIG. 19, the martensite wherein carbides are finely dispersed has been formed. It was also found that with the microstructure shown in FIG. 2, the carbide particles do not appear on the prior-austenite grain boundaries in a shape of film, and that the carbide particles have finely dispersed over an entire region of the microstructure including the prior-austenite grain boundaries.

In example 10, as shown in FIG. 10, quenching was performed at the temperature T1 (950° C.), which is lower than AC3 transformation temperature (972° C.) but higher than the lowest temperature to get the full reversion into austenite phase of 925° C., and the prior-austenite grain size was 7.4 μM.

From above, it is apparent that ductility has been improved in examples 2 to 9, examples 4 and 7 in particular. More specifically, in examples 2 to 9, the steel sheet prepared first had the martensite with carbide particles finely dispersed as a major phase and included residual austenite and alloy precipitates, and the Ac3 transformation temperature fell within the range from 858 to 980° C.

In examples 3, 6, and 9 wherein the heating temperature was maintained to fall within a given range from immediately above the Ac3 transformation temperature, reversely transformed austenite was not made very coarse, and the alloy precipitates were also found to have finely dispersed without being re-dissolved as solids. Consequently, the high-strength die-quenched part that was subjected to quenching in this state formed a microstructure having excellent ductility with fine prior-austenite grains and finely dispersed alloy carbide particles, and exhibited high elongation in tensile test of members. As shown above, when alloy precipitates remain in a finely dispersed state as carbide particles, the amount of carbon dissolved in solid-solution on the mother phase decreases, which contributes to the enhancement in ductility.

In examples 4, 7, and 10 wherein heating was performed within the temperature range between Ac3 transformation temperature and −50 K of that, since alloy precipitates does not become very coarse, ductility improves. Meanwhile, if heating is performed at the temperature lower than −50 K of Ac3 transformation temperature, the alloy precipitates become coarse, and consequently ductility does not improve very much.

Consequently, from the viewpoint of refining prior-austenite grain size and ensuring fine dispersion of alloy precipitates, the heating temperature preferably falls within the range from −50 K to +50 K of Ac3 transformation temperature to ensure the effect of improving ductility.

In the embodiment described above, rapid heating of high-strength steel sheet was performed using the high frequency induction heating device 20 shown in FIG. 7. However, rapid heating can also be performed using the electrical heating device 10 shown in FIG. 6 and heating devices adopting other methods, provided that the temperature can be raised to a desired level within approximately 10 seconds.

According to the present invention, a high-strength die-quenched part having high ductility made of hot stamped members can be provided, along with the manufacturing method of the same.

It goes without saying that the present invention is not limited to the embodiments described above but various variations are possible within the scope of the present invention defined in claims, and that all of them are included in the scope of the present invention.

What is claimed is:
1. A die-quenched part comprising:
A high-strength steel sheet consisting of 0.1 to 0.4 mass % of C, 0.2 to 3 mass % of Si, 0.1 to 5 mass % of Cr, 0.1 to 0.5 mass % of Mo, optional adding 0.0005 to 0.005 mass % of B, and the remainder of substantially Fe and unavoidable impurities, the high-strength steel sheet having a range of Ac3 transformation temperature from 858 to 980° C.,
wherein the prior-austenite grain size of the high-strength steel sheet is 10 μm or smaller,
wherein the die-quenched part has a microstructure of martensite wherein carbide particles are finely dispersed over an entire region including prior-austenite grain boundaries, and a dispersion coefficient of carbide particles is 0.02 or more, the dispersion coefficient of carbide particles being expressed by the following formula (1):

$$\text{Dispersion coefficient of carbide particles} = (d)^{1/2}/L \qquad (1),$$

where d is a mean diameter in nm of the finely dispersed carbide particles and L is a mean spacing of particles in nm,
wherein the die-quenched part is formed by heating a high-strength steel sheet up to an austenite region and then hot stamping and cooling inside a mold so that the dispersion coefficient of carbide particles of the die-quenched part becomes 0.02 or more.

2. A die-quenched part comprising:

A high-strength steel sheet consisting of 0.1 to 0.4 mass % of C, 0.2 to 3 mass % of Si, 0.1 to 5 mass % of Cr, 0.1 to 0.5 mass % of Mo, optional adding 0.0005 to 0.005 mass % of B, and the remainder of substantially Fe and unavoidable impurities, the high-strength steel sheet having a range of Ac3 transformation temperature from 858 to 980° C., wherein the prior-austenite grain size of the high-strength steel sheet is 10 μm or smaller, wherein the die-quenched part has a microstructure of martensite wherein carbide particles are finely dispersed over an entire region including prior-austenite grain boundaries, and a dispersion coefficient of carbide particles is 0.02 or more, the dispersion coefficient of carbide particles being expressed by the following formula (1):

$$\text{Dispersion coefficient of carbide particles} = (d)^{1/2}/L \quad (1),$$

where d is a mean diameter in nm of the finely dispersed carbide particles, and L is a mean spacing of particles in nm, wherein the die-quenched part is formed by quenching a temperature within a range from −50 K to +50 K of Ac3 transformation temperature of a high-strength steel sheet, hot stamping and cooling inside a mold so that the dispersion coefficient of carbide particles of the die-quenched part becomes 0.02 or more.

3. The die-quenched part as set forth in claim 1 or 2, wherein the grain size of the carbide particle is 10 nm or larger.

4. The die-quenched part as set forth in claim 1 or 2, wherein the particle volume fraction of the carbide particles falls within the 1% to 10% range.

5. A method of manufacturing the die-quenched part according to claim 1 or 2, comprising:

heating a high-strength steel sheet up to an austenite region, and then hot stamping and cooling inside a mold, wherein the heating step, the high-strength steel sheet is subjected to rapid heating such as electrical heating or high frequency induction heating.

6. The method of manufacturing a die-quenched part as set forth in claim 5, wherein in the high-strength steel sheet wherein carbide particle is finely dispersed in advance is subjected to rapid heating, and then in the hot stamping and cooling step the high-strength steel sheet is quenched from a temperature within −50 K to +50 K of Ac3 transformation temperature, thus allowing insoluble carbide particle to remain in the high-strength die-quenched part.

7. The method of manufacturing a die-quenched part as set forth in claim 5 wherein the rapid heating from room temperature to the quenching temperature is conducted within 10 to 20 seconds.

8. The die-quenched part as set forth in claim 1 or 2, wherein the range of tensile strength of the die-quenched part is from 1400 MPa to 1500 MPa and the elongation of the die-quenched part is 15% or more.

9. The die-quenched part as set forth in claim 1 or 2, wherein the high-strength steel sheet contains 0.0005 to 0.005 mass % of B.

* * * * *